United States Patent [19]
Wang et al.

[11] Patent Number: 5,386,239
[45] Date of Patent: Jan. 31, 1995

[54] MULTIPLE QAM DIGITAL TELEVISION SIGNAL DECODER

[75] Inventors: Tian J. Wang; Lauren A. Christopher, both of Indianapolis, Ind.

[73] Assignee: Thomson Consumer Electronics, Inc., Indianapolis, Ind.

[21] Appl. No.: 209,357

[22] Filed: Mar. 14, 1994

Related U.S. Application Data

[63] Continuation of Ser. No. 55,338, May 3, 1993, abandoned.

[51] Int. Cl.$^6$ ............................ H04N 7/00; H04N 7/06
[52] U.S. Cl. ................................. 348/472; 348/426; 348/470; 375/39
[58] Field of Search ............... 348/426, 427, 428, 429, 348/430, 431, 432, 433, 436, 437, 438, 384, 390, 392, 391, 423, 424, 425, 470, 441, 471, 472, 473, 475, 474, 493, 492, 607, 624, 725, 484; 375/39, 37, 43; 455/204, 210, 211, 214; H04N 7/06, 7/00, 5/455

[56] References Cited
U.S. PATENT DOCUMENTS

| | | | |
|---|---|---|---|
| 4,535,352 | 8/1985 | Haskell | 358/12 X |
| 5,122,875 | 6/1992 | Raychaudhuri et al. | 358/133 |
| 5,134,464 | 7/1992 | Basile et al. | 358/12 |
| 5,175,626 | 12/1992 | White | 358/142 X |
| 5,196,933 | 3/1993 | Henot | 358/141 X |
| 5,235,424 | 8/1993 | Wagner et al. | 358/174 |
| 5,263,018 | 11/1993 | Christopher | 358/141 |
| 5,264,937 | 11/1993 | Christopher | 358/188 |
| 5,268,761 | 12/1993 | White | 358/174 |

OTHER PUBLICATIONS

S. N. 650,329, Modulator/Demodulator for Compatible High Definition Television, by H. E. White, filed Feb. 4, 1991.
S. N. 922,104, Apparatus for Time Division Multiplexed Processing of Plural QAM Signals, by L. A. Christopher, filed Jul. 29, 1992.
A VLSI Architecture for a High-Speed All-Digital Quadrature Modulator and Demodulator for Digital Ratio Applications, IEEE Journal on Selected Areas in Communications, by Samueli et al., vol. 8, No. 8, Oct. 1990.

*Primary Examiner*—James J. Groody
*Assistant Examiner*—Safet Metjahic
*Attorney, Agent, or Firm*—Joseph S. Tripoli; Eric P. Herrmann; Ronald H. Kurdyla

[57] ABSTRACT

In a video signal processing system, a single adaptive passband equalizer is used to process a composite Quadrature Amplitude Modulated (QAM) signal encoded with high priority (HP) and standard priority (SP) components. The equalizer output is phase corrected by a de-rotator, and filtered to separate the HP and SP components. Error signals respectively representing HP and SP phase errors are developed. One of the error signals controls the operation of the de-rotator. Both error signals are used to generate updated coefficients for the adaptive equalizer. Afterwards the HP and SP components are decoded and combined.

14 Claims, 2 Drawing Sheets

MULTIPLE QAM DIGITAL TELEVISION SIGNAL DECODER

This is a continuation of application Ser. No. 055,338, filed May 3, 1993, now abandoned.

FIELD OF THE INVENTION

This invention concerns a digital high definition television (HDTV) decoding system responsive to a multiple quadrature amplitude modulation (QAM) signal. In particular, this invention concerns a prioritized dual carrier QAM decoding system of the type described in H. E. White U.S. Pat. No. 5,287,180 filed Feb. 4, 1991, and in Raychaudhuri et al. U.S. Pat. No. 5,122,875 issued Jun. 16, 1992.

BACKGROUND OF THE INVENTION

In a QAM symbol transmission system of the type disclosed, a transmitted data symbol is represented by both "I" and "Q" quadrature components which modulate respective quadrature phased carriers at a given frequency. Each symbol may comprise several bits, and the number of bits/symbol dictates the type of QAM system, i.e., 16-QAM, 32-QAM, etc. Each symbol is mapped (assigned) to a prescribed coordinate in a four-quadrant grid-like constellation using a look-up table (e.g., a ROM). A prescribed number of symbols occupy assigned areas in each quadrant. In a 32-QAM system, each quadrant of the constellation contains eight symbols at prescribed coordinates with respect to quadrature I and Q axes. Certain symbol bits designate the constellation quadrant in which a symbol is located, and certain bits designate the particular coordinate in that quadrant assigned to the symbol. QAM systems of this general type are well known.

In the system disclosed in White and in Raychaudhuri et al., a television signal representing high definition image information is transmitted using two QAM carriers frequency multiplexed in a standard 6 MHz television transmission baseband. One of the carriers conveys high priority information, while the other carrier conveys (relatively lower) standard priority information. The high priority (HP) information is the information needed to create a viewable image, although less than a perfect image, and is conveyed with significantly more power than the standard priority (SP) information, which is the remaining information. The high priority information exhibits a narrow bandwidth compared to the standard priority information, and is therefore much less prone to corruption by the transmission channel. The HP carrier is located in that portion of the frequency spectrum of a television transmission channel, e.g., an NTSC channel, which is normally occupied by the vestigial sideband of a standard NTSC television signal. This portion of the signal is normally significantly attenuated by the Nyquist filters of standard receivers, so that HDTV signals with this transmission format will not introduce co-channel interference.

One approach to decoding such a dual QAM signal, as disclosed by White, employs two parallel signal paths for processing high priority and standard priority signal components, respectively. Each path contains an adaptive equalizer. In addition, each path contains a derotator/demodulator responsive to an error signal for carrier recovery (correction) purposes. The complex (I,Q) adaptive equalizers in each of the parallel signal paths of White represent large, complex and expensive hardware components.

A system for reducing the amount of such parallel hardware to produce a less expensive system is described in a copending Lauren A. Christopher U.S. Pat. No. 5,263,018, "Apparatus for Time Division Multiplexed Processing of Plural QAM Signals", filed Jul. 29, 1992. To this end the Christopher system employs time division multiplexed processing of high priority and standard priority components of a received composite signal. While advantageously reducing the hardware requirements compared to the White system, the system described by Christopher introduces the added complication of time division multiplexing. The signal processing system described herein offers a further refinement of a prioritized QAM decoder by advantageously avoiding both the hardware requirements of White and the time division multiplex complexity exhibited by Christopher, without compromising the quality of a decoded QAM signal.

SUMMARY OF THE INVENTION

In accordance with the principles of the present invention, a single adaptive equalizer is used to process a composite QAM signal comprising both a high priority (HP) component and a standard priority (SP) component, i.e., prior to separating the HP and SP components. In an illustrated preferred embodiment of the invention, a composite digital QAM signal containing HP and SP components is equalized by a single wideband adaptive equalizer employing one set of coefficients and one set of multipliers (taps). An output signal from the equalizer is phase-corrected by means of a de-rotator, then filtered to separate the HP and SP components. The separated components are analyzed separately to develop error signals representing symbol position errors in the QAM constellation. The error signals are used to control the operation of the derotator and to update the coefficients of the adaptive equalizer. Afterwards, the HP and SP components are decoded and combined.

DETAILED DESCRIPTION

Before discussing the system shown in FIG. 1, it will be helpful to consider FIG. 2, which depicts the frequency spectrum of a prioritized dual 32-QAM baseband video signal produced by the disclosed system as will be discussed.

Figure 2:
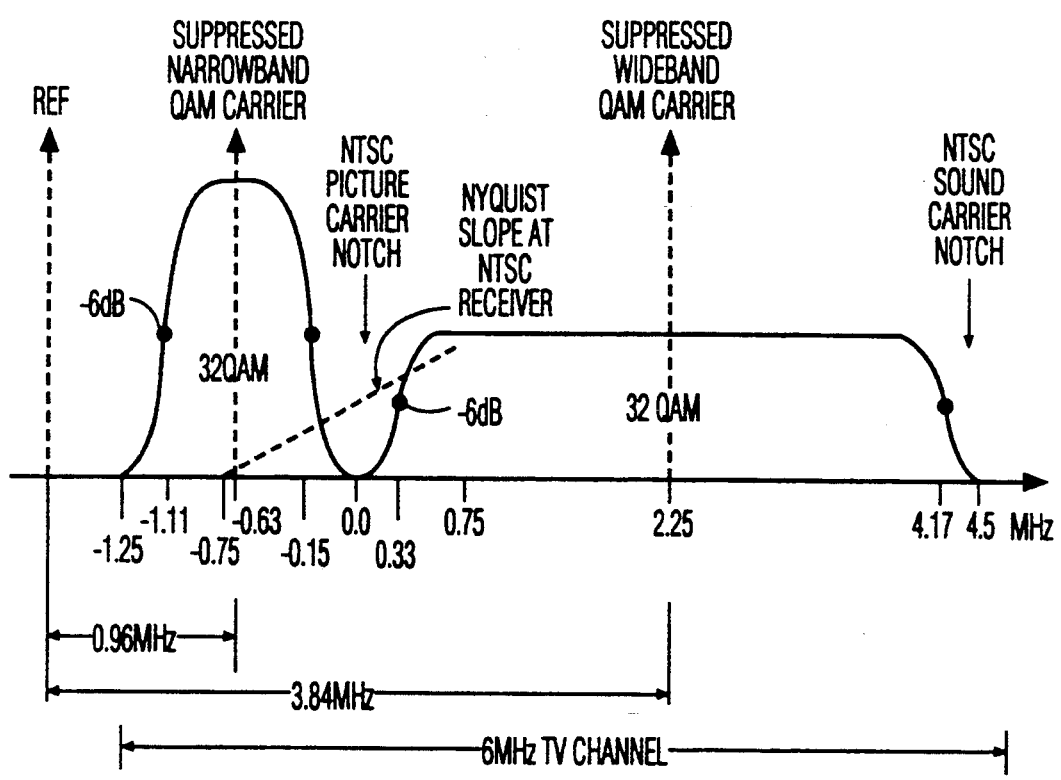
FIG. 2 depicts the baseband video frequency spectrum of a dual QAM high definition television signal received by the system of FIG. 1.

FIG. 2 illustrates the video frequency spectrum of a high definition television signal which is compatible with the 6 MHz bandwidth of a standard NTSC television signal channel, and which can be used as a simulcast signal. To facilitate comparison with a standard NTSC video frequency spectrum, the frequencies along the frequency scale of FIG. 2 (−1.25 MHz to 4.5 MHz) are referenced to the 0.0 MHz frequency location of the RF picture carrier in an NTSC system.

The HDTV signal is a data compressed signal divided into high and standard priority components. In this example audio, synchronizing and low frequency video information components which are intended to be received with high reliability are assigned a high priority. The synchronizing information, for example, may be in the nature of a training signal containing a unique signature or code to facilitate signal recovery and processing at a receiver, and illustratively may include field rate scanning information (e.g., start of field markers). Other less critical components, such as high frequency video information, are assigned a lower standard priority. The high priority information exhibits a narrow bandwidth relative to the standard priority information, and quadrature amplitude modulates (QAM) a 0.96 MHz first suppressed carrier referenced to a carrier reference signal REF as discussed below. The standard priority information quadrature amplitude modulates a 3.84 MHz second suppressed carrier which is also referenced to signal REF. A resulting composite signal is a form of a multiple QAM signal, i.e., a "dual" QAM signal in this instance. The composite dual QAM signal is translated into the 6 MHz standard television band by means of out-of-band reference signal REF. The frequency of signal REF is chosen so that when signal REF is modulated by the composite QAM signal, one of the resulting sum or difference components falls within the band of frequencies associated with a desired radio frequency television channel, such as simulcast VHF channel 3. Signal REF is modulated by the composite dual QAM signal to produce a double sideband modulated signal, the lower sideband of which is rejected and the upper sideband of which is retained as illustrated by FIG. 2.

The amplitude of the narrowband HP QAM component is significantly greater than that of the wideband SP component, e.g., twice as large. The −6 db bandwidth of the HP component is 0.96 MHz, and the −6 db bandwidth of the SP component is 3.84 MHz, which is four times the bandwidth of the HP component. The band edge transition regions of the narrowband HP and wideband SP components are shaped by finite impulse response (FIR) filters with a square root of a raised cosine characteristic, to produce smooth transition regions which avoid unwanted high frequency effects produced by sharp transition regions.

The HP and SP QAM signals each contain quadrature "I" and "Q" components. A data word, or symbol, is represented by both I and Q components. In the case of a 32-QAM signal, each I and Q component exhibits eight discrete amplitude levels, resulting in a total of 32 possible amplitude levels, or values (8 levels×4 quadrants), for each HP and SP QAM signal. Three bits are needed to specify the eight levels of each I and Q component, and two bits specify the QAM constellation quadrant. Thus each symbol requires five bits to specify the thirty-two coordinates of a four quadrant 32-QAM constellation.

The 32-QAM signal to be discussed exhibits symbol rates of 0.96 MHz and 3.84 for the HP and SP data, respectively. The symbol rate is independent of the type of QAM processing being used (e.g., 16-QAM or 32-QAM). Using four time oversampling, the HP sampling rate is 3.84 MHz and the SP sampling rate is 15.36 MHz. At five bits per symbol in the case of 32-QAM, the HP and SP bit rates are 4.8 Mbps and 19.2 Mbps, respectively.

The described prioritized dual QAM system exhibits significant co-channel immunity from interference associated with a standard NTSC television signal, i.e., an NTSC signal transmitted from a different location in the same channel as the dual QAM signal. This is due to attenuating notches in the QAM spectrum in the vicinity of the NTSC RF picture carder and the NTSC sound carrier, which are associated with high energy information. Conversely, co-channel interference from the dual QAM signal into an NTSC signal is significantly reduced because the large amplitude narrowband QAM signal will be significantly attenuated by a Nyquist slope filter in a standard NTSC television receiver. In FIG. 2 the Nyquist slope filter response in a standard NTSC receiver is indicated by a dotted line superimposed on the low band portion of the QAM spectrum from −0.75 MHz to 0.75 MHz. The combination of the 6 dB greater amplitude of the narrowband QAM component and its one-quarter bandwidth relative to the wideband QAM component results in a significantly greater power density than that of the wideband QAM component. The illustrated high priority narrowband QAM signal therefore exhibits a significant signal-to-noise improvement and lower error rate relative to the low priority wideband QAM signal.

The large peak amplitude narrowband component contains video information sufficient to produce a displayed image with definition approximating that of a standard definition television image. Thus a viewer should not be overly disturbed if, for example, the high definition transmission is momentarily disrupted. If the low power wideband component containing the high definition information is disrupted momentarily, the high power narrowband component may be unaffected whereby a lower definition but acceptable image is displayed momentarily.

The invention will be described in the context of an Advanced Definition Television (ADTV) receiver system of the type for processing HDTV signals proposed by the Advanced Television Research Consortium (ATRC). The television signal represented by the spectrum shown in FIG. 2 is such a proposed HDTV signal. However, the practice of the invention is not limited to use in such a system.

Figure 1:
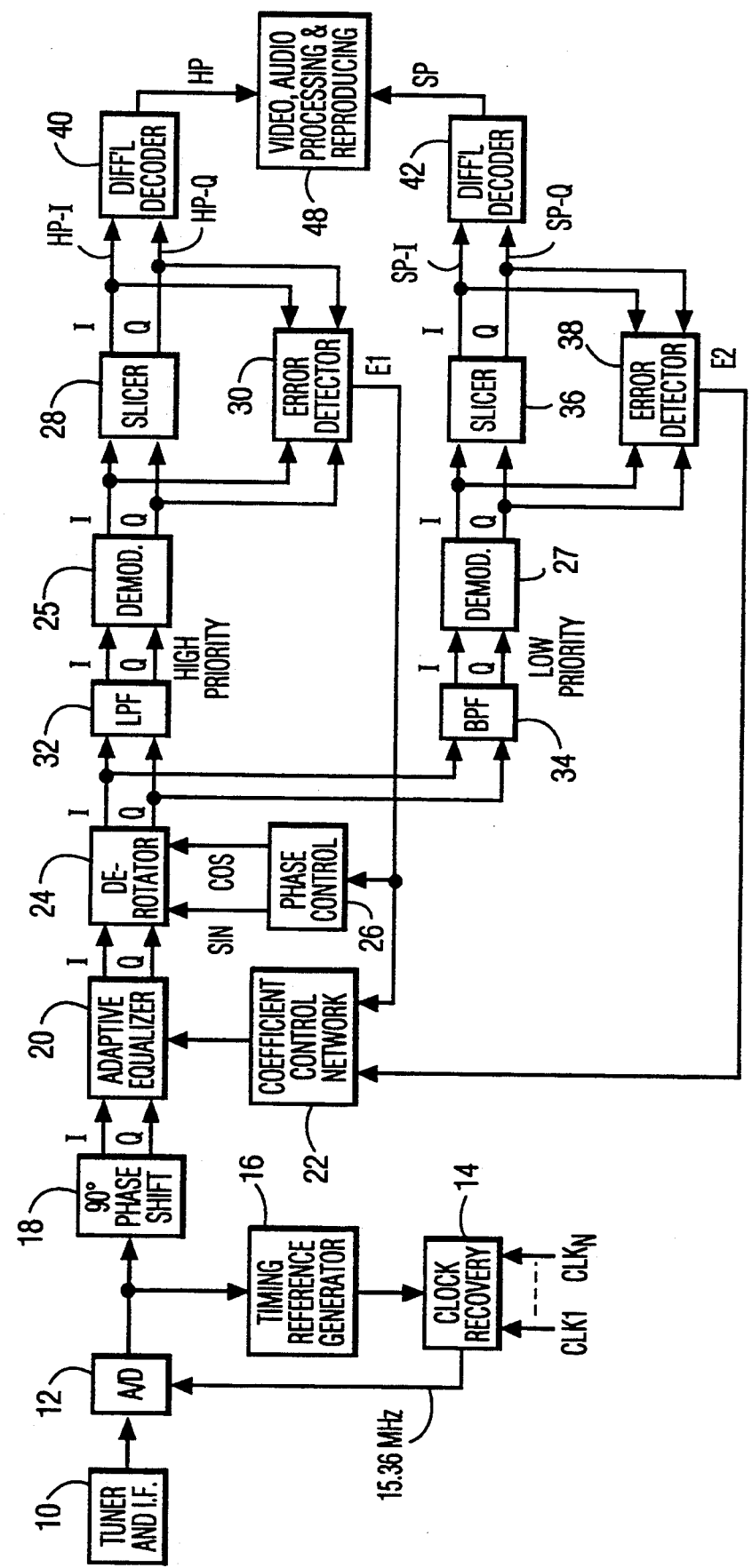
FIG. 1 is a block diagram of a digital HDTV QAM receiver/decoder in accordance with the principles of the present invention.

FIG. 1 illustrates a portion of an ADTV receiver incorporating apparatus according to the present invention. A broadcast television signal having the spectral characteristics illustrated in FIG. 2 is applied to an input unit 10 including tuner and Intermediate Frequency (IF) network. A local oscillator in the IF network down converts the center of the SP channel to the symbol rate of the SP channel (3.84 MHz), whereby the center of the HP channel is down-converted to the symbol rate of the HP channel (0.96 MHz). The IF frequency is 43.5 MHz in this example, which places the center of the baseband SP channel at 3.84 MHz. The down converted signal is converted from analog to digital form by an analog-to-digital converter 12. Converter 12 is clocked at 15.36 MHz, which is four times the symbol rate of the SP data.

Timing reference generator 16 includes band-edge timing recovery circuits for developing a symbol rate clock from the HP or SP spectrum of the QAM signal provided to unit 16 from the output of A/D converter 12. Unit 14 may include a voltage controlled crystal oscillator incorporated in a phase locked loop for deriving a 15.36 MHz sampling clock for A/D converter 12 in response a symbol rate output signal from reference generator 16. The symbol rate output signal from unit 16 synchronizes the oscillator in unit 14. Clock recovery unit 14 also develops other clock signals $CLK_1$ ... $CLK_N$ for application to other units of the system as needed. Additional details of clock recovery networks to recover a symbol rate clock from a QAM signal are found in the reference text Digital Communications by Lee and Messerschmitt (Klewer Academic Press, Boston, Mass. U.S.A., 1988).

The composite digital QAM signal, including HP and SP components each with I, Q quadrature components, is applied to a 90° phase shifting network 18 which separates the I and Q components. The HP and SP "I" component appears at the I output of unit 18, and the HP and SP "Q" component appears at the Q output of unit 18. Unit 18 may employ a 90° Hilbert phase shifter, as is known, to provide the separated quadrature I and Q components, or a pair of multipliers (mixers) which respond to the output signal from unit 12 and to respective sine and cosine reference signals.

The HP, SP I signal and the HP, SP Q signal from unit 18 are applied to a signal conditioning network including a complex digital adaptive (FIR) equalizer 20 which compensates for transmission channel perturbations, and a QAM constellation de-rotator 24. Equalizer 20 is a single wideband equalizer with a response defined by one set of coefficients, and having one set of multipliers, and responds to dynamically updated filter coefficients from a unit 22 as will be discussed. Adaptive equalization is discussed in detail in the Lee and Messerschmitt text mentioned previously. De-rotator 24 compensates for a dynamic phase error manifested by a slight rotation of the received QAM constellation. This error may be produced by a variety of factors including local oscillator frequency variations, for example. The constellation phase error/rotation may be significantly reduced or eliminated by a so-called carrier recovery network. In this example the carrier recovery network includes de-rotator 24 which responds to equalized I and Q signals from unit 20, a phase control unit 26, a slicer 28, and an error detector 30 which develops an error signal E1 for use by phase control unit 26. Units 24, 28, 30 and 26 comprise the essential elements of a digital phase locked loop for eliminating the dynamically varying QAM constellation offset. A filter 32 and a baseband demodulator 25 are included in the phase locked loop.

More specifically, the composite QAM signal is separated into its High Priority (HP) and Standard Priority (SP) components by means of a real coefficient digital low pass filter 32 and a real coefficient digital band pass filter 34, respectively. More expensive complex coefficient filters also could be used. The following description of the processing of the HP component from filter 32 via units 25, 28, 30 and 40 also applies to the processing of the SP component from filter 34 via corresponding units 27, 36, 38 and 42.

The high priority I and Q components from filter 32 are demodulated to baseband by means of demodulator 25, which may exhibit one of several known forms. For example, demodulator 25 may comprise a time demultiplexer and inverter to perform the demodulation mixing process. For additional information about digital QAM modulation and demodulation, see *VLSI Architecture for a High-Speed All-Digital Quadrature Modulator and Demodulator for Digital Radio Applications*, H. Samueli, IEEE Journal on Selected Areas in Communications, Vol. 8, No. 8, Oct. 1990.

Slicer 28 contains a mapping mechanism and is programmed to select the constellation symbol closest in distance to the received signal sample. The complex I, Q plane (constellation) is divided into decision regions where each decision region is the set of points that is closest to some symbol. If, after examining a decision region for a symbol, a received symbol is found to be located at or offset in distance from an expected coordinate, slicer 28 produces an output symbol at the expected coordinate. The slicer output symbol differs from the slicer input symbol by the amount of any distance offset. The amount of any such offset is sensed by error detector 30, which produces an output error signal E1 as a function of the amount of offset. Output error signal E1 may be produced by a complex multiplier associated with error detector 30.

The error signal from detector 30 is provided to phase control unit 26 for generating quadrature sine and cosine correction coefficients. These correction coefficients, and the I, Q components from equalizer 20, are provided to multipliers associated with de-rotator 24 for performing the de-rotating function. It can be shown that any set of quadrature signals can be rotated to a desired angular position by performing a complex multiplication on the quadrature signals. That is, quadrature signals I and Q can be rotated to conform to corrected quadrature signals I' and Q' according to the expressions:

$I' = I \cos(\phi) + Q \sin(\phi)$ $Q' = Q \cos(\phi) - I \sin(\phi)$ where $(\phi)$ is an error correction angle produced as a function of error signal E1 in this example. A more detailed discussion of a carrier recovery network including this type of de-rotator apparatus is found in the Lee and Messerschmitt text noted previously.

Only one error signal, E1 in this example, is needed to dynamically restore (de-rotate) the QAM constellation to a correct orientation, since an error signal derived from either the HP component or the SP component would represent substantially the same carrier frequency or phase error, and would produce the same control effect.

Error signal E1 also is applied to a control input of coefficient control network 22 associated with equalizer 20. Another control input of network 22 receives an error signal E2 generated by slicer 36 and error detector 38 in the standard priority component processor. Standard priority error signal E2 is generated in the same manner as previously discussed high priority error signal E1. Unit 22 is a digital signal processor responsive to a prescribed algorithm for providing updated equalizer filter coefficients as a function of error signals E1 and E2. The algorithm used by network 22 may vary, depending on the requirements of a particular system. For example, updated coefficients may be generated simply as a result of combining error signals E1 and E2, and may operate so as to minimize error signals E1 and E2 substantially simultaneously. The updated coefficients generated by network 22 are applied to a coefficient Random Access Memory (RAM) associated with digital adaptive FIR equalizer 20.

An adaptive equalizer such as unit 20 is a complex, hardware intensive device even when, as in this embodiment, it is not subjected to time multiplexed operation at a high switching rate. Equalizer 20 is considerably more complex than other signal processing units including units 24, 25, 26, 28, 30, 32 and 40. Equalizer 20 may be of a conventional design with an adaptive digital FIR filter network to compensate for amplitude and frequency/phase irregularities caused by the transmission channel. In this example equalizer 20 is a decision directed passband equalizer responsive to dynamically updated coefficients provided by network 22 in response to feedback error signals E1 and E2. The equalizer coefficients are dynamically updated by signals E1 and E2 after an initialization interval during which equalizer 22 is initialized using blind equalization or using training signal techniques. Equalizer 20 preferably is a fractionally spaced device which exhibits an adaption rate which is a fraction of the symbol rate.

Processed high priority components HP-I and HP-Q from unit 28, and processed standard priority components SP-I and SP-Q from unit 36, are respectively decoded by units 40 and 42 to recreate the original bitstreams. Units 40 and 42 include a differential decoder to perform the inverse of the differential symbol coding and mapping operations performed by the transmitter encoder for both HP and SP data. Look-up tables are used to un-map the four quadrant signal constellations into the original sequential five-bit symbol segments which existed at the transmitter before being differentially encoded and QAM modulated as is shown.

Recovered HP symbol data from decoder 40 and recovered SP symbol data from unit 42 are applied to respective inputs of an audio/video signal processing and reproducing unit 48. Unit 48 may include data decompression networks such as Huffman decoders and inverse quantizers, error correcting networks, and de-multiplexing networks for providing separate audio and video television signal components. These components may be reproduced by suitable sound reproduction or video display means. Alternatively, these components may be stored by magnetic or optical storage media.

What is claimed is:

1. In a system for processing a television signal, digital signal processing apparatus comprising:
   input means for receiving a multiple carrier composite QAM signal conveying data occupying given locations in a grid-like constellation;
   signal conditioning means, including adaptive equalizer means, responsive to said composite signal for providing a conditioned composite signal at an output, said equalizer means including a single equalizing device having a wideband response encompassing more than one of said carriers and defined by one set of coefficients for equalizing said more than one carriers without separating said more than one carriers from the spectrum of said composite signal prior to equalization;
   means for deriving an error signal representing a condition of said QAM signal; and
   means for coupling said error signal to said signal conditioning means.

2. Apparatus according to claim 1, wherein
   said multiple carrier composite signal comprises a first carrier modulated by a first information component, and a second carrier modulated by a second information component;
   said deriving means includes means for separating said first information component and said second information component of said conditioned composite signal, and detector means responsive to a separated component from said sensing means for developing said error signal; and wherein said apparatus further includes
   means for combining said separated first and second components.

3. Apparatus according to claim 1, wherein
   said equalizer means exhibits non-time-multiplexed operation.

4. Apparatus according to claim 2, wherein
   said composite signal is a digital high definition television signal and said first and second components are frequency multiplexed in a baseband spectrum.

5. Apparatus according to claim 4, wherein
   said first and second components exhibit different carrier frequencies and different bandwidths occupying different portions of a television signal video spectrum.

6. Apparatus according to claim 2, wherein said signal conditioning means further includes
   de-rotator means responsive to an equalized composite signal from said equalizer means, and to an error signal developed by said detector means for maintaining a desired orientation of said constellation.

7. Apparatus according to claim 6, wherein
   said detector means derives first and second error signals from said separated first and second components, respectively;
   said equalizer means is responsive to said first and second error signals; and
   said de-rotator means is responsive to one of said error signals.

8. Apparatus according to claim 2 and further including
   means for differentially decoding said first component and said second component prior to being combined by said combining means.

9. Apparatus according to claim 4, wherein
   said baseband spectrum is constituted by a first frequency band occupying the lowermost portion of said spectrum, and a second frequency band occupying the remainder of said spectrum, said first band being narrower than said second band, exhibiting higher energy than said second band, and containing higher priority information than said second band.

10. Apparatus according to claim 9, wherein
    said first band contains low frequency video information and audio information; and
    said second band contains high frequency video information occupying frequencies including standard chrominance frequencies and a standard chrominance subcarrier frequency.

11. Apparatus according to claim 1, wherein
    said adaptive equalizer means is a fractionally spaced passband equalizer.

12. In a system for processing a television signal, digital signal processing apparatus comprising:
    input means for receiving a composite multiple carrier QAM signal conveying data symbols occupying given locations in a grid-like constellation, said multiple carrier composite signal comprising a first carrier modulated by a first component, and a second carrier modulated by a second component;
    signal conditioning means including (a) adaptive equalizer means exhibiting non-time-multiplexed operation and responsive to said composite signal for providing an equalized composite signal at an output, said equalizer means including a single equalizing device having a response encompassing said first and second modulated carriers for equalizing said first and second modulated carriers without separating said first and second modulated carriers from the spectrum of said composite signal prior to equalization; and (b) de-rotator means for maintaining a desired orientation of said constellation;

means for separating said first component and said second component of a conditioned composite signal from said conditioning means;

first means responsive to separated symbols associated with said first component for producing corresponding output symbols at a respective predetermined coordinates;

first detector means for producing a first error signal representing an offset between coordinates of respectively corresponding input and output symbols of said first means;

second means responsive to separated symbols associated with said second component for producing corresponding output symbols at respective predetermined coordinates;

second detector means for producing a second error signal representing an offset between coordinates of respectively corresponding input and output symbols of said second means; wherein said adaptive equalizer means is responsive to said first and second error signals; and said de-rotator means is responsive to one of said first and second error signals.

13. In a system for processing a television signal, digital signal processing apparatus comprising:

input means for receiving a multiple carrier composite PAM signal;

signal conditioning means, including adaptive equalizer means, responsive to said composite signal for providing a conditioned composite signal at an output, said equalizer means including a single equalizing device having a wideband response encompassing more than one of said carriers and defined by one set of coefficients for equalizing said more than one carriers without separating said more than one carriers from the spectrum of said composite signal prior to equalization;

means for deriving an error signal representing a condition of said PAM signal; and means for coupling said error signal to said signal conditioning means.

14. In a system for processing a television signal, digital signal processing apparatus comprising:

input means for receiving a composite multiple carrier PAM signal, said multiple carrier composite signal comprising a first carrier modulated by a first component, and a second carrier modulated by a second component;

signal conditioning means including adaptive equalizer means exhibiting non-time-multiplexed operation and responsive to said composite signal for providing an equalized composite signal at an output, said equalizer means including a single equalizing device having a response encompassing said first and second modulated carriers for equalizing said first and second modulated carriers without separating said first and second modulated carriers from the spectrum of said composite signal prior to equalization;

means for separating said first component and said second component of a conditioned composite signal from said conditioning means;

first means responsive to separated data associated with said first component for producing corresponding output data;

first detector means for producing a first error signal representing an offset between respectively corresponding input and output data of said first means;

second means responsive to separated data associated with said second component for producing corresponding output data;

second detector means for producing a second error signal representing an offset between respectively corresponding input and output data of said second means; wherein said adaptive equalizer means is responsive to said first and second error signals.

* * * * *